Figure 1:
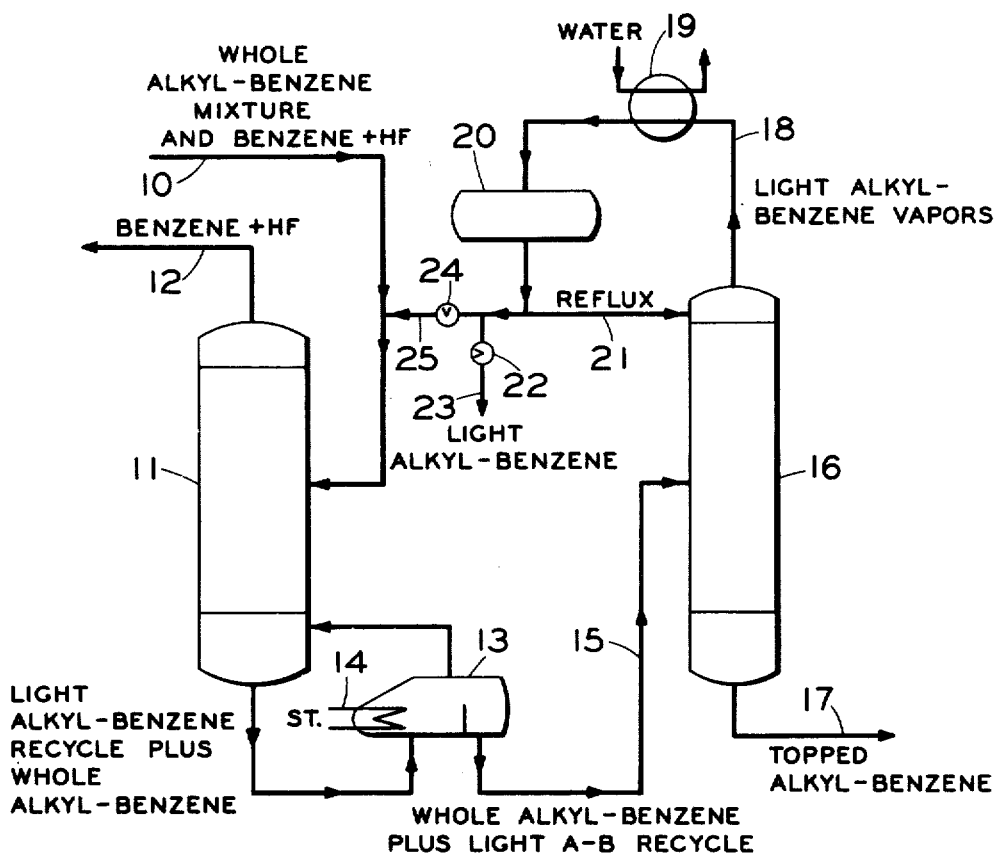

Patented Oct. 20, 1953

2,656,310

UNITED STATES PATENT OFFICE 2,656,310

HYDROCARBON FRACTIONATION

Leland L. Henning, El Cerrito, Calif., assignor, by mesne assignments, to California Research Corporation, San Francisco, Calif., a corporation of Delaware Application December 20, 1949, Serial No. 134,048

2 Claims. (Cl. 202—40)

1

The present invention relates to a fractionation procedure for alkylation processes, and more particularly to the recovery of aromatic hydrocarbon in an alkylation process wherein an alkyl hydrocarbon is reacted with an excess of aromatic hydrocarbon.

This invention is particularly directed to an improved method of recovering aromatic hydrocarbons in a process such as that disclosed in the two Lewis patents, 2,477,382 and 2,477,383, issued July 26, 1949. As disclosed in these two patents, $C_{12}$–$C_{15}$ propylene polymers are contacted with aromatic compounds such as benzene, toluene, xylene or naphthalene, in the presence of a hydrofluoric acid catalyst, at between about 50° F. and 150° F. to produce a wide boiling range alkyl aryl reaction product. As therein disclosed, the mol ratio of benzene to polymer may be as great as 10:1 or higher, so that following the alkylation process it is necessary to separate the excess aromatic compound from the alkyl aryl reaction product. This separation may be accomplished by fractional distillation of the reaction mixture produced in the alkylation process. However, it has been found that an improvement in the separation of the benzene from the alkyl benzene mixture can be accomplished without degradation of color properties of the alkyl benzene mixture and fragmentation of the alkyl group on the benzene minimized when this separation is performed in accordance with the process set forth by the present invention. This improved separation can likewise be accomplished with a lower temperature level by the herein disclosed process.

In its broadest form, the present invention contemplates an improvement in the recovery of aromatic hydrocarbon from an alkylation process wherein an excess of aromatic hydrocarbon is reacted with an alkylating hydrocarbon by continuously passing the reaction mixture which comprises the excess aromatic hydrocarbon and the alkyl aryl reaction product into a rectification zone to separate an overhead fraction, including the unreacted aromatic hydrocarbon, and a bottoms fraction comprising the alkyl aryl reaction product, continuously passing the bottoms fraction into a second rectification zone, and fractionally separating therefrom a minor overhead fraction comprising the lower boiling component of the reaction product and introducing at least a portion of this overhead fraction from the second rectification zone into the first rectification zone, together with the reaction mixture.

Further advantages and objects of the present invention will become apparent from the following detailed description taken in conjunction with the accompanying drawing.

In the drawing, Figure 1 represents in diagrammatic form a process for the recovery of excess aromatic hydrocarbon from an alkyl aryl reaction product in accordance with the present invention.

Referring now to the drawing, whole alkyl benzene and benzene which comprise the reaction mixture produced in the alkylation of propylene polymers with an excess of benzene in the presence of a hydrofluoric acid catalyst is introduced through line 10 to a conventional bubble-tray distillation column 11, wherein the desired rectification of the reaction mixture is effected to separate an overhead fraction. This overhead fraction, which in the present example is shown to be benzene and any residual hydrofluoric acid not previously separated from the reaction mixture, is drawn off through line 12. Since the reaction mixture may be introduced into the distillation column 11 at a temperature considerably below the bubble point of the mixture, it is necessary to add heat to perform the desired rectification. This is accomplished by reboiler 13 which is adapted to recycle the bottoms fraction from column 11. As diagrammatically shown, the necessary heat for the operation of reboiler 13 may be provided by a conventional steam coil 14.

In contradistinction to other distillation processes, the entire bottoms of column 11 are liquid and are withdrawn from reboiler 13 into line 15, which in turn feeds a second rectification, or distillation, column 16. Distillation, or rectification, column 16 is provided for fractionating the whole alkyl benzene to obtain the heavier alkyl benzene fraction desired for the production of alkyl aryl sulfonates for detergents and wetting agents. Accordingly, fractionation is performed in column 16, and the topped alkyl benzene withdrawn through line 17, while the overhead fraction of light alkyl benzene vapors are withdrawn through line 18. These vapors are then passed through a condenser 19, wherein water may be used to perform the desired condensation, and the liquefied vapors collected in a reflux drum 20. For a purpose well understood in the art, a portion of the liquefied vapors collected in drum 20 may be returned as reflux through line 21 at the top of the fractionating column 16. Through valve 22 and line 23, a portion of the light alkyl benzene may be withdrawn for storage or return to the alkylation process.

In order to reduce the operating temperature of rectification column 11, a portion of the light alkyl benzene may be returned through valve 24 and line 25 for mixture with the feed supplied through line 10.

As an example of the improvement in the operation of the separation of benzene from the reaction mixture of benzene and alkyl aryl reaction product effected by the above-described process, it has been found that the alkyl benzene and benzene supplied through line 10 has an atmospheric boiling point between approximately 450 and 525°. With this feed alone introduced into the rectification column 11 which will normally be operated under pressure, it would be necessary to supply a high temperature of up to about 600° F. to the bottoms of the rectification column to effect the desired separation, and in so doing degradate both the color properties and the detergency characteristics of the sulfonated product of the alkyl benzene reaction product. This is particularly true when a portion of the hydrofluoric acid catalyst is present in the reaction mixture, since at these temperatures the catalyst tends to promote fragmentation or isomerization of the alkyl group. However, by the introduction of the light alkyl benzene recycle with the reaction mixture it has been possible to reduce the bottoms temperature to between about 400° to 450° F. at approximately 15 p. s. i. gage so that continuous distillation to drive off the benzene as an overhead fraction may be effected in column 11 at a substantially lower temperature than heretofore has been thought necessary to effect separation. A further important advantage of the present system resides in the fact that a means is provided for reducing the bubble point of the bottoms without the introduction of steam as has been the common practice in the distillation art heretofore. This is significant in view of the advantage in maintaining the system as anhydrous as possible to prevent the formation of hydrous hydrofluoric acid which is extremely corrosive to the operating equipment.

In commercial practice it has been found that with a feed of 5100 barrels per day (B. P. D.) of alkyl aryl reaction mixture having a bubble point of 490° F. at atmospheric pressure, the desired separation can be effected at 15 p. s. i. gage in column 11 by the recycling of from 600 to 900 B. P. D. of light alkyl benzene recovered from column 16 with an operating temperature of about 440° F. at the bottom of column 11.

While the foregoing examples have been discussed in the terms of alkyl benzene and benzene, it will be understood by those skilled in the art that any of the aromatic hydrocarbons such as xylene, toluene or naphthalene and alkyl aryl hydrocarbon mixtures may be separated in a system such as that disclosed herein. It will also be appreciated that this improvement in the separation of aromatics would be equally applicable to similar processes in which different alkyl polymers and aromatic hydrocarbons are alkylated in the presence of other volatile catalysts, such as $BF_3$. Likewise, the process would be applicable where a solid alkylation catalyst is employed.

While changes and modifications in the above-described process will be apparent to those skilled in the art, all such modifications as are within the scope of the appended claims are hereby included.

I claim:

1. In a process for fractionally distilling a mixture comprising alkyl aryl hydrocarbons having a wide boiling range, aromatic hydrocarbons and HF, said mixture being separated from the reaction product obtained by contacting mixed olefinic hydrocarbons having a wide boiling range with a molar excess of aromatic hydrocarbon in the presence of HF; the steps which comprise continuously passing said mixture into a first distillation zone and separating in said first zone a first overhead fraction consisting essentially of unreacted aromatic hydrocarbon and HF and a bottoms fraction comprising a mixture of alkyl aryl hydrocarbon having a wide boiling range, continuously passing said bottoms fraction into a second distillation zone and separating, in said distillation zone, a second minor overhead fraction comprising the lower boiling alkyl aryl hydrocarbons, condensing said second overhead fraction and introducing a substantial portion of the condensate into said first distillation zone, together with said mixture to substantially reduce the bubble point thereof.

2. The process of claim 1 wherein the aromatic hydrocarbon is benzene.

LELAND L. HENNING.

References Cited in the file of this patent

UNITED STATES PATENTS

| Number | Name | Date |
|---|---|---|
| 1,957,818 | Carney | May 8, 1934 |
| 2,070,864 | Ragatz | Feb. 16, 1937 |
| 2,232,117 | Kyrides | Feb. 18, 1941 |
| 2,404,340 | Zimmerman | July 16, 1946 |
| 2,437,356 | Hill | Mar. 9, 1948 |
| 2,477,382 | Lewis | July 26, 1949 |

Certificate of Correction

Patent No. 2,656,310                                            October 20, 1953

Leland L. Henning

It is hereby certified that error appears in the printed specification of the above numbered patent requiring correction as follows:

Column 4, line 35, after "said" insert *second*;

and that the said Letters Patent should be read as corrected above, so that the same may conform to the record of the case in the Patent Office.

Signed and sealed this 15th day of December, A. D. 1953.

[SEAL]

ARTHUR W. CROCKER,
*Assistant Commissioner of Patents.*